United States Patent [19]

Kai et al.

[11] Patent Number: 4,678,421
[45] Date of Patent: Jul. 7, 1987

[54] RESIN MOLDING APPARATUS

[75] Inventors: Toru Kai, Inazawa; Kouichi Kato, Ichinomiya, both of Japan

[73] Assignee: Toyoda Gosei Co., Ltd., Nishikasugai, Japan

[21] Appl. No.: 801,403

[22] Filed: Nov. 25, 1985

[30] Foreign Application Priority Data

Nov. 26, 1984 [JP] Japan .................. 59-248860

[51] Int. Cl.⁴ ............ B29C 45/03; B29C 45/07
[52] U.S. Cl. ...................... 425/159; 264/328.4;
264/328.11; 264/328.14; 425/160; 425/547;
425/556; 425/557; 425/574; 425/586
[58] Field of Search ........... 264/328.4, 328.14, 328.11;
425/542, 544, 547, 551, 552, 557, 556, 561, 256,
259, 574, 159, 160, 559, 575, 586

[56] References Cited

U.S. PATENT DOCUMENTS

| | | |
|---|---|---|
| 2,478,013 | 8/1949 | Roddy .................. 264/328.14 |
| 2,675,584 | 4/1954 | Fienberg et al. ............. 425/259 |
| 3,655,319 | 4/1972 | Bradshaw et al. ............ 425/267 |
| 3,940,467 | 2/1976 | Brachman ................. 264/45.5 |
| 3,941,534 | 3/1976 | Hunkar .................... 425/145 |
| 3,981,655 | 9/1976 | Horbach ................... 425/181 |
| 4,069,290 | 1/1978 | Pasch .................... 264/297.2 |
| 4,090,836 | 5/1978 | von der Ohe et al. ......... 425/574 |
| 4,131,411 | 12/1978 | Kupf et al. ................ 425/557 |
| 4,201,742 | 5/1980 | Hendry .................... 425/552 |
| 4,260,359 | 4/1981 | Dannels et al. ............. 425/552 |
| 4,344,750 | 8/1982 | Gellert .................... 425/552 |
| 4,388,265 | 6/1983 | Bandoh .................... 425/544 |

FOREIGN PATENT DOCUMENTS 2543877 4/1977 Fed. Rep. of Germany .
2710779 10/1978 Fed. Rep. of Germany .

Primary Examiner—Jay H. Woo
Assistant Examiner—Timothy W. Heitbrink
Attorney, Agent, or Firm—Cushman, Darby & Cushman

[57] ABSTRACT

A resin molding apparatus which can produce a molded resin article having neither a runner nor a gate portion thereon. The resin molding apparatus comprises a pouring pot including a pot having a heating member provided therein, and a piston member disposed for up and down movement within the pot and having a lifted position in which the piston member defines part of a mold cavity. Since the appratus has no runner or gate portion therein, the necessity of a high injecting force to be applied to a metal mold and hence of a high mold clamping force can be eliminated and the overall size of the apparatus can be reduced.

4 Claims, 4 Drawing Figures

RESIN MOLDING APPARATUS

BACKGROUND OF THE INVENTION

1. Field of the Invention

This invention relates to a resin molding apparatus for producing molded articles of a resin material which have no runner nor gate portions thereon.

2. The Prior Art

Most of molded articles of a thermoplastic material produced by using metal molds are produced by using an injection molding technique, that is an injection molding apparatus. In the injection molding technique, a molding material which is heated into a fluidized (plasticized) state in a cylinder is injected under a high pressure into a cavity through a narrow runner or gate portion within a metal mold and is cooled into a rigid state or cured, and then the metal mold is opened and a molded article is taken out of the metal mold.

However, such an injection molding technique as described above has following drawbacks:

(1) since the material must run through a narrow flow path such as a runner or a gate, a very high injecting force is required, resulting in the necessity of a correspondingly high mold clamping force, and in order to attain such a high mold clamping force, the system must be large in size and hence the spacing for installation and the cost for equipment of the system will readily increase;

(2) since the injection molding apparatus essentially requires in its structure a runner, a gate and so on in order to produce a molder article therein and material remaining at such portions of the molded article after molding will be thrown away, the efficiency percentage is low; and (3) where a change of arrangements such as color changing is effected frequently, a large amount of material remaining in a large injecting plunger will be thrown away, making a great loss.

SUMMARY OF THE INVENTION

It is an object of the present invention to provide a resin molding apparatus which eliminates such drawbacks of conventional resin molding apparatus and can produce a molded resin article which have no runner nor gate thereon.

The invention embodies the concept that if the narrow runners and gates which are provided in a conventional injecting molding apparatus can be eliminated, the high injection force which is normally applied directly to a metal mold can be eliminated, which will result in a reduction in the mold clamping force and also in reduction in the size of the entire system.

According to the invention, there is provided a resin molding apparatus of the type having a frame member, an upper mold secured to the frame member, a lower mold mounted for up and down movement relative to the upper mold and having a lifted position in which the lower mold is abutted with the upper mold, and a pouring pot means disposed within the lower mold, wherein the pouring pot means comprises a pot having a heating member provided therein, and a piston member disposed for up and down movement within the pot and having a lifted position in which the piston defined part of a cavity.

Here, since the piston member and the pot cooperatively define a material flow path, a wide runner and gate can be obtained and hence molding can be attained with a low injecting (filling) force. Besides, since the piston member defines part of a cavity when it is at a lifted position therof, a molded article will have no runner nor gate portion thereon.

The upper mold serves as a fixed mold secured to a frame member while the lower mold serves as a movable mold which can reciprocate in up and down directions. When the movable mold is lifted to its lifted position, a cavity is defined between the movable mold and the fixed mold, and the pouring pot means is provided in a central portion of the lower mold and is communicated with the cavity while the piston member mounted for up and down movement defines part of the cavity when the piston member is at the lifted position thereof. The piston member acts to inject (or to fill) molten resin material poured into the cavity of the pot of the pouring pot means.

According to the invention, since a resin molding apparatus is constituted such that molten resin material supplied in a pot of a pouring pot means formed in a lower mold is injected (or filled) into a cavity by means of a piston having an upper face which defines part of the cavity, there is no narrow throttle portion in a material flow path for molten metal material, and hence the injecting force can be reduced one-third to one-fifth comparing with that of conventional injection molding apparatus. As a result, since the apparatus need only have a mold clamping force corresponding to such a low injecting force, the apparatus can be reduced in size and in cost.

Further, since the pouring pot means serves also as a material flow path for a runner or a gate portion, a molded article after molding will have no runner nor gate portion thereon. Accordingly, since treatment of gate portion after molding becomes unnecessary and material for a runner and a gate portion to be thrown away is reduced, the efficiency percentage of material usage can be improved.

Besides, since resin material which remains in a plasticizing cylinder of a material supply unit is low in quantity even where articles are produced in a small quantity and changing operations such as color changing are effected very frequently, material to be thrown away is low in quantity, resulting in improvement in the efficiency percentage of material usage.

DETAILED DESCRIPTION OF THE PREFERRED EMBODIMENT

Figure 1:
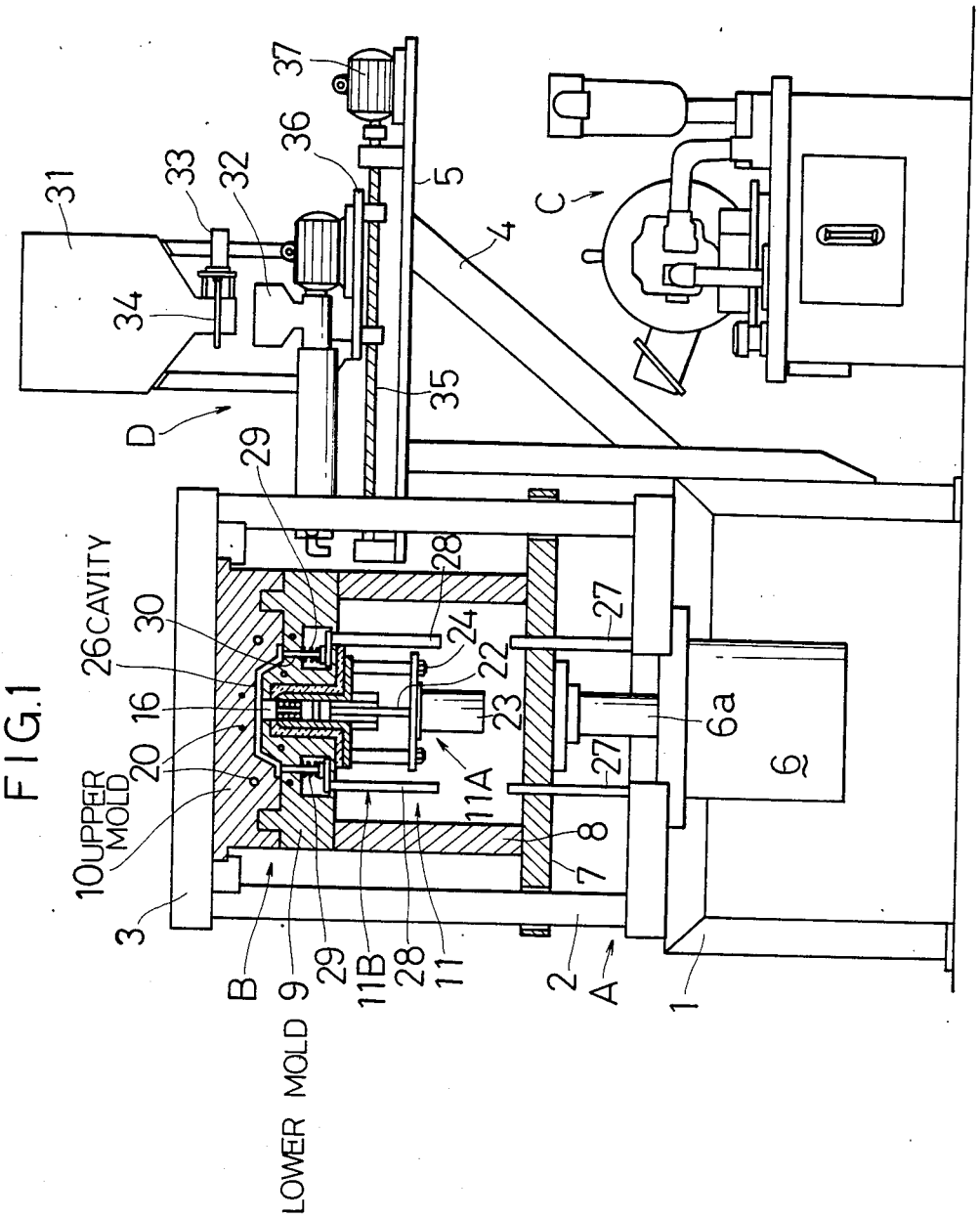
FIG. 1 is a front elevetional view, partly in section, showing an entire resin molding apparatus according to a preferred embodiment of the present invention.

Referring first to FIG. 1, the resin molding apparatus includes a machine frame section A, a metal mold section B mounted on the machine frame section A, a hydraulic unit C located near the machine frame section A for operating a mold clamping cylinder a drive means which will be hereinafter described in detail, and a material supply unit D mounted on the machine frame section A for supplying a molten resin material.

The machine frame section A includes a lower base 1, four supports 2 mounted uprightly on the lower base 1, a ceiling member 3 secured at top ends of the supports 2 and extending in a horizontal plane, and a projecting base 5 secured at one end thereof to two of the supports 2 and supported on an inclined frame member 4.

The metal mold section B includes a mold clamping cylinder 6 mounted on the lower base 1, a slide base 7 mounted for guidance by the supports 2 and connected to be reciprocally moved in a vertical direction by an operating rod 6a which extends upwardly from the mold clamping cylinder 6, upright members 8 secured to the slide base 7, a female or lower mold (movable mold) 9 secured to the top ends of the upright members 8, an uppermold (fixed mold) 10 secured to a lower face of the ceiling member 3, and an injecting and separating unit 11 mounted on the lower mold 9.

The injecting and separating unit 11 includes an injecting pot means 11A, and an article removing means (ejector mechanism) 11B.

Figure 2:
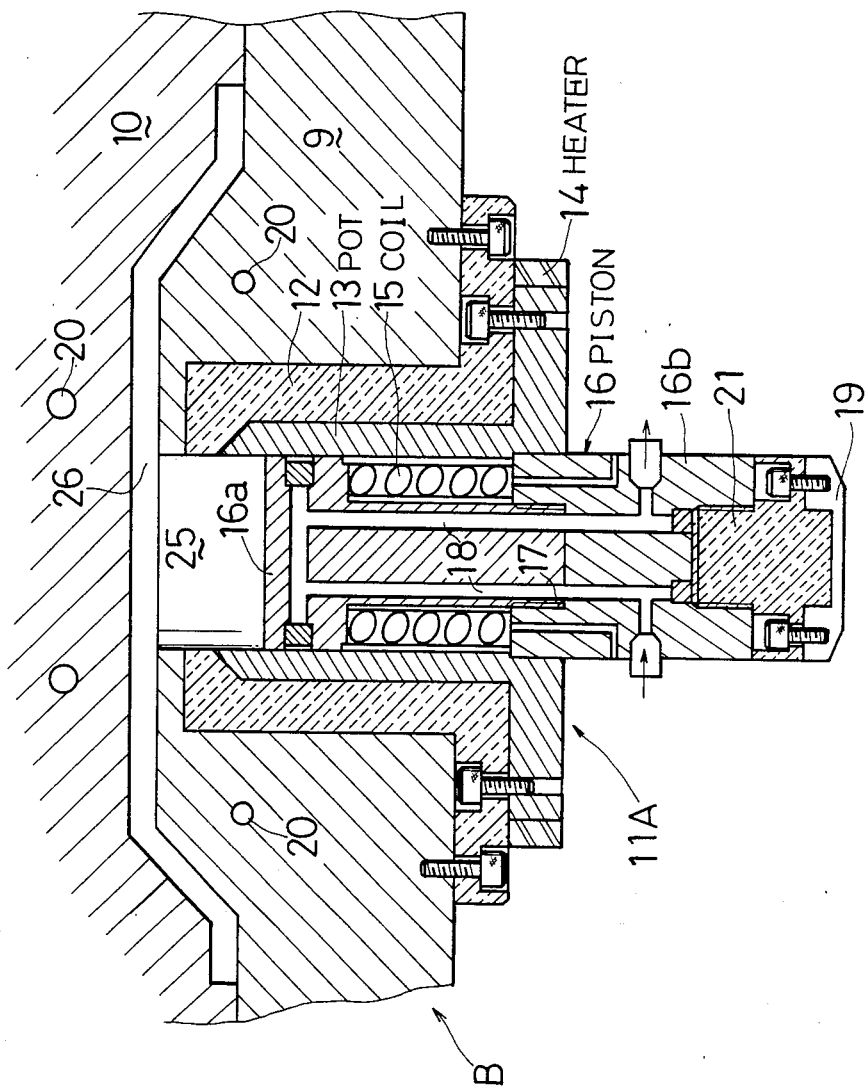
FIG. 2 is an enlarged cross sectional view of essential part of the apparatus of FIG. 1.

Referring now to FIG. 2, the injecting pot means 11A includes a heat insulating member 12 secured to a lower face of the lower mold 9, a pot 13 secured inside the heat insulating member 9 and adapted to be heated to a temperature from 200° to 300° C. by a heater 14 in the form of a ring, and a piston member 16 mounted for reciprocal sliding motion in a vertical direction on an inner peripheral portion of the pot 13. The piston member 16 includes a first piston 16a having a coil 15 for high-frequency heating mounted around an outer periphery thereof, and a second piston 16b threadably fixed to a lower end of the first piston 16a with a seal 17 interposed therebetween. The second piston 16b cooperates with first piston 16a to define therebetween circulating paths 18 formed therein. It is to be noted that the piston member 16 consists of the first piston 16a and the second piston in order that the coil 15 for high-frequency heating may be mounted thereon, and if the coil 15 can be mounted on an inner periphery of the pot 13, the piston member may otherwise be formed from a single member. The piston member 16 is connected to a hydraulic cylinder 23 having an operating rod 22 by way of a heat insulating member 21 and a connecting member 19. The hydraulic cylinder 23 is held by a holding member 24. The piston member 16 has, at a lifted position thereof, an upper face thereof substantially leveled with a lower face of a cavity 26, thus defining part of the cavity 26. On the other hand at a lowered position of the piston member 16, the upper face thereof cooperates with the pot 13 to define a cylindrical spacing 25 into which molten resin material may be put from the material supply unit D which will be hereinafter described in detail. Meanwhile, the first piston 16a is normally heated by the coil 15 for high-frequency heating mounted on the outer periphery thereof. Circulating paths 18 are provided for feeding water in a direction of indicated by the arrows in FIG. 2, after molding of a molded product, to thus cool the piston member 16, and after the molded product has been cooled into a rigid body to make such cooling unnecessary, compressed air may be fed into the path 18 to remove the water therefrom. As a result, the piston member 16 will be heated to again raise the temperature thereof by the high-frequency heating coil 15, mounted on the outer periphery of the piston member 16.

Figure 3:
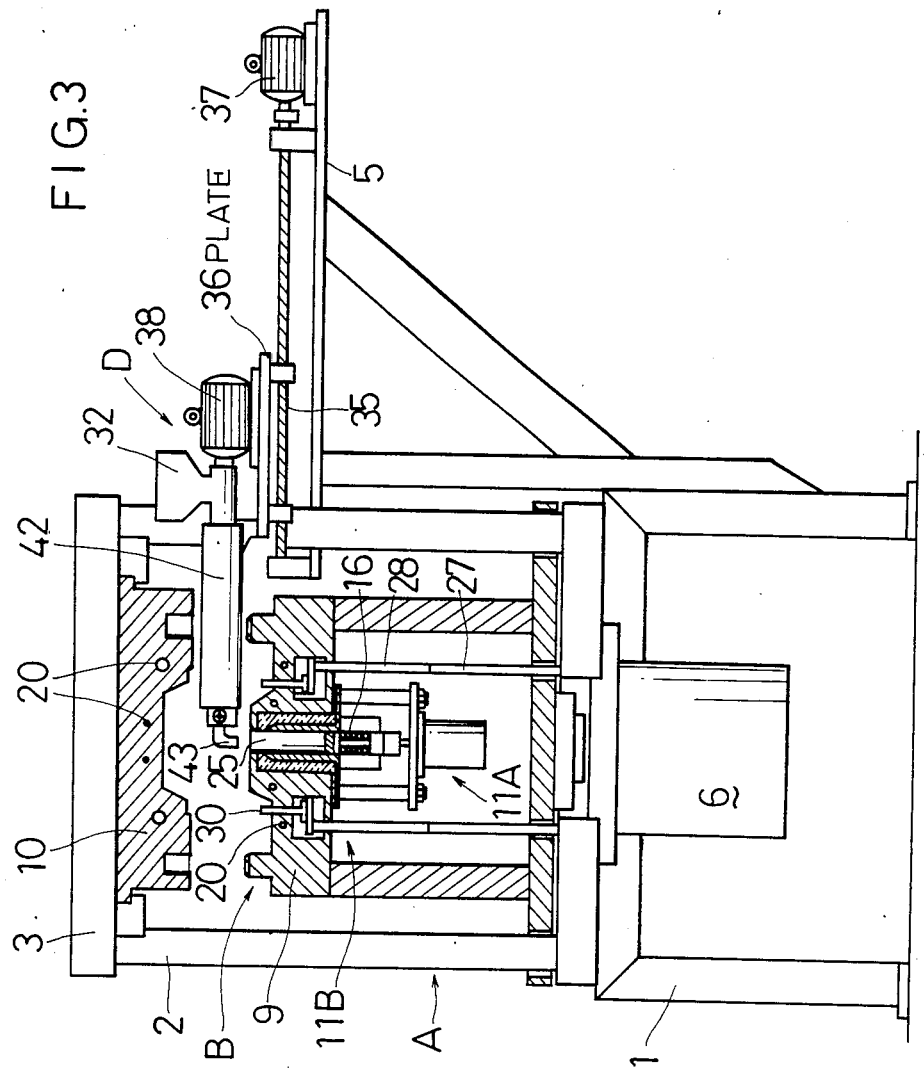
FIG. 3 is a front elevational view showing the apparatus of FIG. 1 in an operating condition.

Meanwhile, the article removing means 11B includes upright rods 27 mounted on the lower base 1 as shown in FIG. 1, operating rods 28 disposed for abutting engagement with upper ends of the rods 27 when the lower mold 9 moved to a position as shown in FIG. 3, and pushing-up pins 30 mounted within the lower mold 9 and connected to upper ends of the operating rods 28. The pushing-up pins 30 are urged downwardly by coil springs 29. The article removing means 11B is provided to push up a molded article by the pushing-up pins 30 to remove the article from the lower mold 9 when the lower mold 9 moves downwardly.

Figure 4:
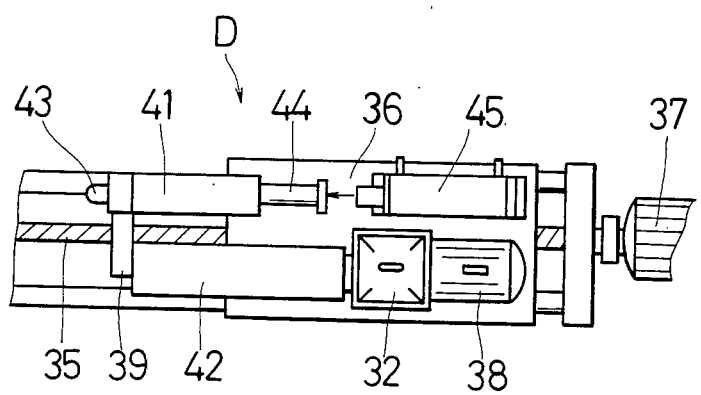
FIG. 4 is a plan view of an injection device of FIG. 1.

The hydraulic unit C is connected to the mold clamping cylinder 6, the hydraulic cyliner 23 and an injecting cylinder 45 (which will be hereinafter described) by a means not shown for operating those cylinders, and may be a conventional hydraulic unit. The material supply unit D includes, as shown in FIG. 1 and also in FIG. 4 which is a partial plan view of the arrangement of FIG. 1, a plasticizing cylinder 42, a motor 38 for driving a screw in the cylinder 42, a hopper 32 for supplying a resin material in the form of pellets into the plasticizing cylinder 42, a supply plunger 41 for storing plasticized resin material therein, and a cylinder device 45 for pushing a piston rod 44 of the supply plunger 41 to supply molten resin material from the supply plunger 41 into the spacing 25 in the pot means. All of the components of the material supply unit D are mounted on a plate 36.

The plate 36 is secured, by means of a ball screw member, to the projected base 5 secured to the lower base 1. A motor 37 for rotating a screw 35 of the ball screw member is secured to the projected base 5. Accordingly, by operating the motor 38, the material supply unit D mounted on the plane 36 can be reciprocally moved as a whole along the screw 35 of the ball screw member.

Synthetic resin material plasticized and melted within the plasticizing cylinder 42 is fed into and stored in the supply plunger 41 passing the check valve 39, and by operating the cylinder device 45 to push the piston rod 44 when the plate 36 is at an advanced position as seen in FIG. 3, the resin material can be fed into the spacing 25 within the pot means passing a pouring port 43.

A large hopper tank 31 is disposed above the hopper 32, and from the large hopper tank 31, an amount of resin material in the form of pellets corresponding to the volume of the cavity 26 is supplied, as a shutter 34 is opened and closed. A cylinder 33 is provided to drive the shutter 34 for opening and closing operations.

Description will now be given of a process of producing a molded article using the resin molding apparatus according to the embodiment of the invention.

By driving the motor 37 to rotate the screw 35 when the lower mold 9 is at the lowered position as seen in FIG. 3, the material supply unit D located on the plate 36 is advanced. In this instance, at the material supply unit D, resin material in the form of pellets for about one charge supplied into the hopper 32 from the hopper tank 31 is fed into the plasticizing cylinder 42 in which it is plasticizied and melted by the screw and is then stored into the supply plunger 41 passing the check valve 39. Then when the pouring port 43 comes to a position just above spacing 25 defined by the piston 16 and the pot 13 of the pouring pot means 11A provided on the lower mold 9, the advancement of the material supply unit D is stopped.

Subsequently, the cylinder device 45 is operated to push the piston rod 44 to fill an amount of the molten resin material within the supply plunger 41 for one pouring into the spacing 25.

After that, the motor 37 is rotated reversely to retract the material supply unit D from between the upper mold 10 and the lower mold 9. At the same time, the above-described process of melting resin material beginning in the hopper tank 31 and ending in the supply plunger 41 is resumed for a subsequent charging of the molding apparatus.

Then, the lower mold 9 is lifted into contact with the upper mold 10 to form a cavity 26 as shown in FIG. 2. In this instance, while the upper mold 10 and the lower mold 9 are normally cooled by flowing water through water path 20 disposed within the molds 10 and 9, molten resin material is hardly cooled since it is within the pot 13 around which the heat insulating member 12 is disposed. Further, since the pot 13 is heated to a temperature from 200° to 220° C. or so by the ring-formed heater 14 and the piston 16 is normally warmed by the high-frequency heating coil 15, the molten resin material never becomes rigid.

Subsequently, by operating the hydraulic cylinder 23 to lift piston 16 as shown in FIG. 1, the molten resin material is poured into the cavity 26 until the upper end face of the piston 16 is brought to a position substantially flush with the bottom of the cavity 26 and hence the piston 16 defines part of the cavity 26.

In this instance, since the upper mold 10 and the lower mold 9 are normally cooled, the molten resin material poured into the cavity 26 begins to solidify itself. However, since the piston 16 is normally warmed by the high-frequency heating coil 15, the molten resin material around the top end face of the piston 16 does not begin its solidification. Therefore, simultaneously with ending of pouring, water is fed into the circulating path 18 within the piston 16 to cool the piston 16 in order to solidify the molten resin material.

After the molten resin material has been solidified to form a molded article, the cylinder 6 is operated to lower the lower mold 9. As a result, the upright rods 27 mounted on the lower base 1 are abutted with the operating rods 28 of the molded article removing means 11B to lift the pushing-up pins 30 against the coil springs 29 to separate the molded article from the lower mold 9. In this instance, at the pouring pot means 11A, the hydraulic cylinder 23 is operated to lower the piston 16 while compressed air is fed into the circulating path 18 to remove water therefrom, thereby stopping cooling of the piston 16 by water. Accordingly, the piston 16 returns again to its original condition in which it is heated by the high-frequency heating coil 15.

One cycle of operation for forming a molded article of a resin material is effected in this manner. By repeating this cycle, molded articles of a resin material are produced one by one.

The a time required for one such cycle was about 60 seconds, with the embodiment of the invention.

What is claimed is:

1. A resin molding apparatus comprising;
    a frame member;
    an upper mold secured to said frame member;
    a lower mold mounted for up and down movement relative to said upper mold, said lower mold having a lifted position in which said lower mold is abutted with said upper mold and defines a mold cavity therewith;
    a pouring pot means disposed within said lower mold said pouring pot means including a pot with a heating member provided therein and a piston member disposed for up and down movement within said pot and having a lifted position in which said piston defines part of said cavity; and
    a material supply unit mounted on said frame member for back and forth movement between said upper and lower molds when said lower mold is at a lowered position thereof,
    said material supply unit including:
        a plasticizing cylinder for plasticizing a resin material,
        a supply plunger for supplying the resin material into said pot of said pouring pot means,
        a drive device provided for individually driving said plasticizing cylinder and said supply plunger, and
        a ball screw member for moving said plasticizing cylinder, said supply plunger and said drive device back and forth as a unit.

2. A resin molding apparatus according to claim 1, wherein
    said piston member having a heating coil disposed around an outer periphery of said piston member and said piston member having a cooling path formed therein,
    said piston member further consisting of two members which are formed and arranged to allow said heating coil to be mounted on said piston member.

3. A resin molding apparatus according to claim 1, wherein
    said lower mold having an article removing mechanism for removing an article from said lower mold when said lower mold is moved down to a lowered position.

4. A resin molding apparatus according to claim 1, wherein
    each of said upper and lower molds having a cooling path formed at a portion adjacent said cavity.

* * * * *